United States Patent Office 3,420,121
Patented Jan. 7, 1969

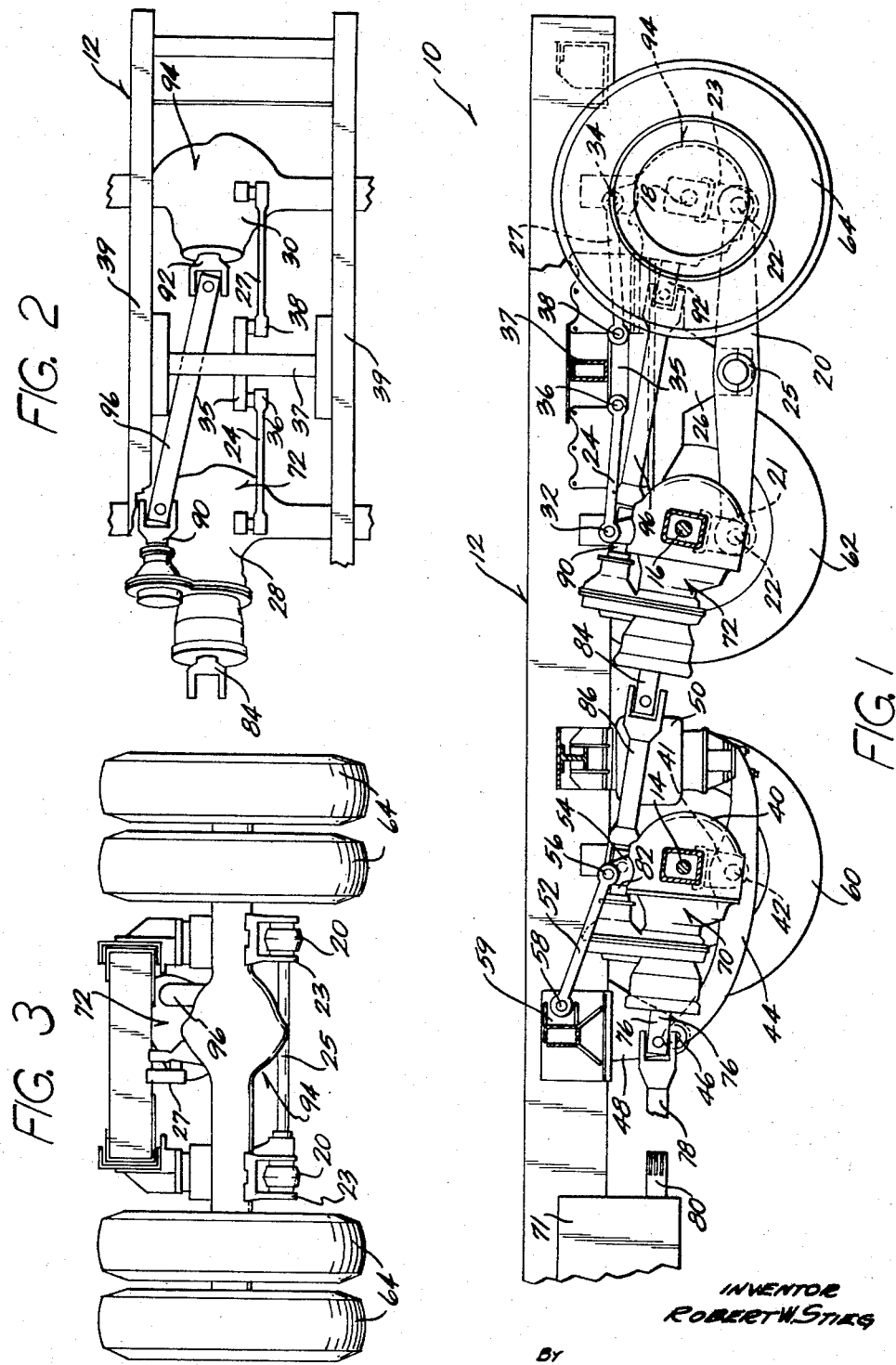

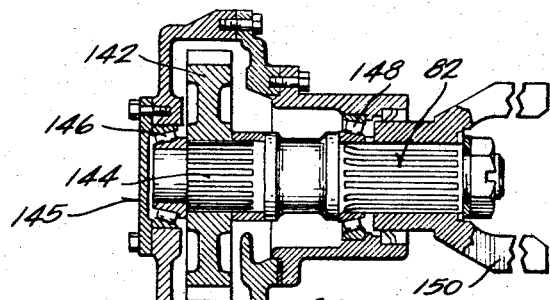
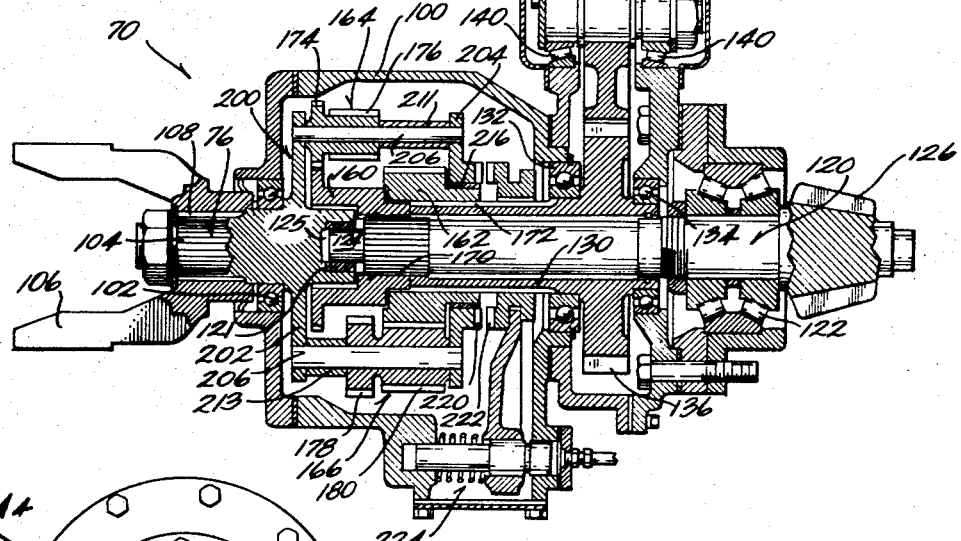
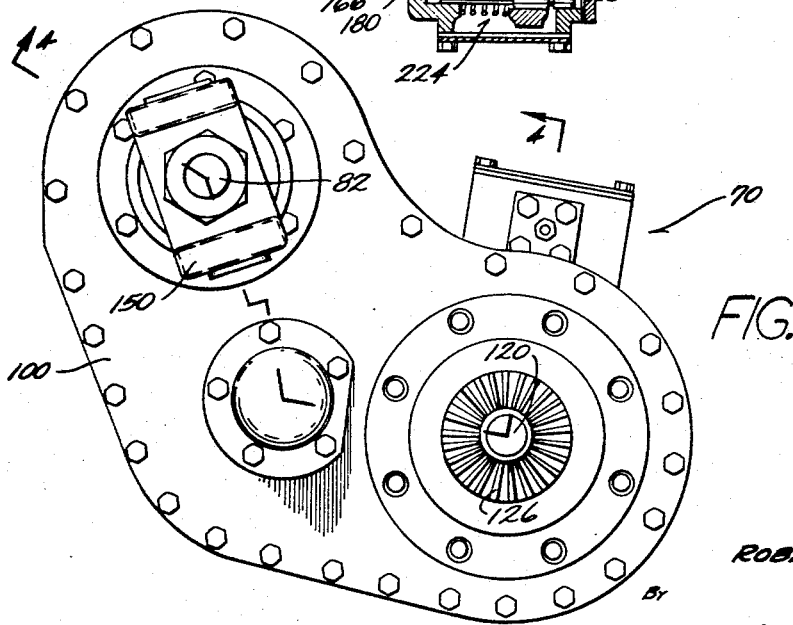

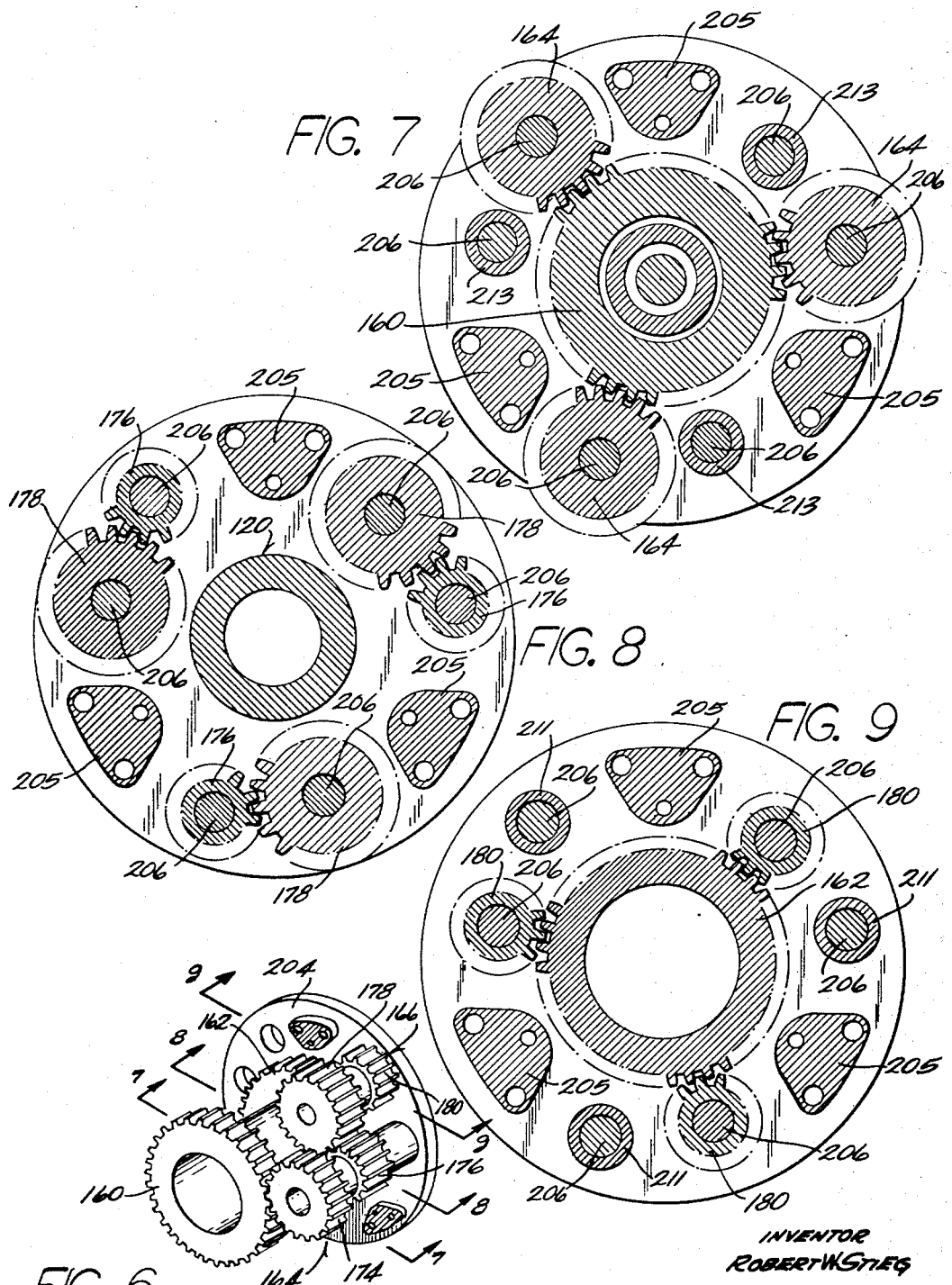

3,420,121
TORQUE DIVIDING SPUR GEAR DIFFERENTIAL
Robert W. Stieg, Clintonville, Wis., assignor to FWD Corporation, Clintonville, Wis., a corporation of Wisconsin
Original application Oct. 29, 1965, Ser. No. 505,707. Divided and this application Oct. 23, 1967, Ser. No. 677,175
U.S. Cl. 74—714          3 Claims
Int. Cl. F16h 1/42

ABSTRACT OF THE DISCLOSURE

A drive train to multiple driven rear axles in a vehicle includes a torque dividing differential having a pair of output shafts which transmit the power to separate axles or groups of axles, the torque division, the number of axles served by each output shaft, and the number of wheels on each said axle being chosen to effect application of a torque on each driving wheel in proportion to its ground loading. The differential employed in so dividing the torque is a novel form of spur gear differential in which each set of planetary pinions on the differential carrier comprises a reducing gear train between the differential side gears.

Cross reference

This application is a division of my application Ser. No. 505,757, filed Oct. 29, 1965, and assigned to FWD Corporation.

Summary of the Invention

An object of this invention is to provide a novel torque dividing spur gear differential which may be used in a multi-axle vehicle to divide engine torque unequally among axles, or for any other purpose requiring unequal torque at the output shafts. My differential is different from previous torque dividing differentials in having sets of meshing pairs of spur or equivalent planet pinions of different sizes to form reducing gear trains between side gears.

The novel torque dividing spur gear differential generally comprises a pair of spaced side gears which are respectively connected to shafts. First and second spur gear (or equivalent) pinion sets are rotatably supported on the carrier of the differential and are meshed with each other. The pinion sets each have two axially aligned gears which are connected for simultaneous rotation. The gears of at least one of the respective gear sets have differing numbers of teeth. Each pinion set comprises a first pinion meshed with a side gear and a second pinion fixed to the first and meshed with the second pinion of the other set of the pair. The first pinion of the other set of the pair meshes with the other side gear. This arrangement affords torque division between the side gears, which respectively drive the first and second output shafts. The side gears may have the same number of teeth if the pinion axes are set in a different circle for each set. Preferably the carrier is driven.

Whenever used herein, the term "spur gear" includes equivalent cylindrical gears, and the term "spur gear differential" differentiates a differential of the general type shown in FIG. 7 of Patent 3,191,708 from a "planetary differential" with co-planar sun and ring gears, and from a "bevel gear differential" having bevel pinion gears.

Drawings

FIGURE 1 is a side elevational view, with parts broken away, of the rear portion of a multi-axle vehicle incorporating my invention;

FIGURE 2 is a plan view of a portion of the structure shown in FIGURE 1;

FIGURE 3 is an end elevational view of the vehicle of FIGURE 1;

FIGURE 4 is a cross sectional view of a torque dividing spur gear differential embodied in the vehicle shown in FIGURE 1 and taken along line 4—4 of FIGURE 5;

FIGURE 5 is an end elevational view of the differential shown in FIGURE 4;

FIGURE 6 is a perspective view of a portion of the differential shown in FIGURE 4;

FIGURE 7 is a cross sectional view taken along line 7—7 of FIGURE 6;

FIGURE 8 is a cross sectional view taken along line 9—9 of FIGURE 6.

Description

Referring now to the drawings and more particularly to FIGURE 1, the vehicle 10 in which I prefer to use my differential generally includes a frame 12 to which is connected a plurality of driving axles. Any number of driving axles can be employed with this invention, as long as one or more of the inter-axle differentials divide their output torques unequally. In the illustrated embodiment, the frame 12 carries three rear axles 14, 16 and 18. The rear axles 16 and 18 include combined axle and differential housings 28 and 30, which housings carry downwardly depending brackets 21 and 23 to which walking beams 20 are pivotally connected by suitable pivot means 22 (see FIGURE 1). The walking beams 20 are, in turn, centrally pivotally connected to opposite ends of a transverse beam 25 which is carried on the frame 12 by supports 26. The axle housings 28 and 30 are also connected to frame 12 by the radius arms 24 and 27. The radius arms 24 and 27 are pivotally connected to the axle and differential housings 28 and 30 through suitable pivot means 32 and 34 and are connected by suitable pivot means 36 and 38 respectively to a fore and aft bracket 35 (FIGURE 2) fixed to a transverse beam 37 carried between the side members 39 of the frame 12. The axle 14 includes axle and differential housing 40 having, on each side thereof, a downwardly depending bracket 41 which is pivotally connected by suitable pivot means 42 to a trailing arm 44. The trailing arm 44 is pivotally connected by pivot means 46 to a bracket 48 carried on the frame 12. The free end of the trailing arm 44 is connected to the frame 12 by an air bag or spring 50 to afford spring action and selective variable loading on the axle 14.

A radius arm 52 is pivotally connected at one end thereof to a bracket 54 on the differential housing by pivot means 56, and at its other end is pivotally connected by pivot means 58 to a cross member 59 of the frame 12. The rear axles 14, 16 and 18 respectively carry wheels 60, 62 and 64 which may be single wheels, or dual wheels as shown in FIGURE 3, on all the axles or may be combinations of single and dual wheels on the various axles, provided the torque is properly divided.

The axles 14, 16 and 18 are connected to an engine 71 through an inter-axle torque-dividing spur differential 70. The spur gear differential 70 is connected directly to the differential of axle 14, and the other axles 16 and 18 are driven through a second inter-axle differential 72 which is connected to the torque-dividing 70.

Specifically, the torque-dividing differential 70 includes an input shaft 76 which is connected to the engine 71 through a drive shaft 78 connected to the engine output shaft 80 through a conventional drive train (not shown) and universally connected to the differential input shaft 76. The torque-dividing differential 70 affords unequal torque division between the axle 14 and output shaft 82 to the remaining pair of axles 16 and 18 (see FIG- URES 1 and 4), as will hereinafter be described. The output shaft 82 of differential 70 (FIGURES 1 and 4) is connected to the input shaft 84 of the second inter-axle differential 72 through a drive shaft 86 which is universally connected to the output shaft 82 of differential 70 and to the input shaft 84 of differential 72.

The second inter-axle differential 72 is connected to the axle 16 to afford equal torque division between the axle 16 and axle 18. The output shaft 90 is connected to the input shaft 92 of a conventional axle differential 94 through a drive shaft 96 which is universally connected to the output shaft 90 and to the input shaft 92.

In the three axle example illustrated, the torque dividing inter-axle spur gear differential 70 affords torque division between the axle 14 and the second inter-axle differential 72 in a ratio of 1–2 respectively. The second inter-axle differential 72 affords torque division between the axle 16 and 18 in a ratio of 1–1. Therefore, the torque division among the axles 14, 16 and 18 is equal, with each axle receiving ⅓ of the engine torque.

If desired, my invention can be employed with a vehicle provided with two axles having differing loads per axle. For example, the torque dividing differential 70 may be arranged to divide the engine torque between the two axles in the ratio of 1–2. Then if the axle receiving the lesser amount of torque has a given load, the axle receiving the greater amount of torque should have twice that load and on a uniform coefficient surface each wheel will therefore develop its maximum potential drawbar force at the same time. Likewise my invention, in addition to two and three axle applications, may be applied to four, five, or any number of additional axles.

Referring now to FIGURES 4 and 5, the inter-axle spur gear differential 70 generally comprises a casing or housing 100 which is formed for attachment to the combined differential and axle housing 40 for the axle 14. The input shaft 76 is rotatably carried on the casing 100 by a suitable bearing 102 and has a splined end 104 which receives a universal joint yoke 106 having a complementary splined bore 108.

The housing 100 rotatably carries a first output shaft 120 by suitable bearings 122 proximate one end of shaft 120. The other end of the output shaft 120 includes a stub shaft 124 which is piloted in a bearing 121 in bore 125 in the end of the input shaft 76 to afford relative rotation between the input shaft 76 and the output shaft 120. First output shaft 120 carries a bevel gear 126 at its end, which bevel gear 126 is the input gear for a suitable differential gearing (not shown) in the axle 14 to supply power to the wheels 60 of axle 14. A sleeve 130 is rotatably carried on the casing 100 by suitable bearings 132 and 134, and encircles the first output shaft 120. The sleeve 130 carries a gear 136 which engages idler gear 138 rotatably carried on the housing by suitable bearings 140. The idler gear 138, in turn, engages an output gear 142 secured to the output shaft 82 by a spline 144. The output shaft 82 is carried on a projecting part 145 of the housing 100 by suitable bearings 146 and 148 and has at its end a universal joint yoke 150.

Means are provided in differential 70 for dividing the engine torque unequally between output shafts 120 and 82. In the illustrated embodiment, said means generally comprise a pair of side gears 160 and 162, first and second spur gear sets 164 and 166 and carrier means 200 for rotatably connecting the first and second gear sets to the input shaft 76. Side gear 160 is splined to the first output shaft 120 by splined connection 170. Side gear 162 is spaced from and free of engagement with side gear 160 and is splined to the sleeve 130 by splined connection 172. Each first spur gear set 164 includes first and second spur gears or portions 174 and 176. Each second spur gear set 166 includes first and second spur gears or portions 178 and 180. The respective individual spur gears of each spur gear set disirably have differing numbers of teeth. In the embodiment shown, the spur gears 174 and 178 of the first and second gear sets 164 and 166 respectively have an equal number of gear teeth, which number is greater than the number of gear teeth of spur gears 176 and 180 which also have an equal number of teeth.

Carrier means 200 are provided for rotatably connecting the first and second gear sets 164 and 166 to the input shaft 76. The carrier means 200 includes a pair of spaced side plates 202 and 204 connected to each other by spacer blocks 205 (FIGS. 7, 8 and 9) and by a series of transverse shafts 206 equal in number to the number of spur gear sets 164 and 166 employed. The gear sets 164 are prevented from axially moving on the shafts 206 by a cylindrical spacer 211, and the gear sets 166 are prevented from axially moving on the shaft 206 by cylindrical spacers 213. The spur gear sets 164 and 166 are rotatably carried on the shafts 206, which are arranged so that the spur gear 176 of the first spur gear set 164 having the lesser number of teeth is engaged with the spur gear 178 of the second spur gear set 166 having the greater number of teeth, and with the spur gear 174 of the first gear set 164 having the greater number of teeth engaged with the side gear 160, and with the spur gear 180 of the second gear set 166 having the lesser number of teeth engaged with the side gear 162. (See FIGURES 6 through 9.) Since the side gears have an equal number of teeth, the shafts 206 for sets 164 are on a different circle than those for sets 166.

The side plate 204 of the carrier 200 is rotatably carried on a bushing 216 on the side gear 162, and is provided with locking teeth 220 which cooperate with corresponding locking teeth 222 on a differential lock arrangement generally identified by the numeral 224. The differential lock 224 does not form a part of this invention and will therefore not be described in detail.

In the illustrated embodiment, the side gear 160 has 27 teeth and is engaged with the spur gear 174 having 14 teeth. The spur gear 176 has 10 teeth and is engaged with the spur gear 178 having 14 teeth. The spur gear 180 has 10 teeth and is engaged with the side gear 162 having 27 teeth. Accordingly, this arrangement affords a torque reduction between the side gear 160 and the side gear 162 of 1.4 to 1 times 1.4 to 1, or approximately a 2:1 ratio. Since the side gear 160 is connected to the output shaft 120 and the side gear 162 is connected to output shaft 82 (both as previously described), the engine torque is divided between the output shafts 120 and 82 in the ratio of 1:2. Therefore, the axle 14 will receive 33⅓ percent of the torque, and the inter-axle differential 72 will receive 66⅔ percent of the torque. Inter-axle differential 72, in turn, divides the 66⅔ percent of the torque equally between the axles 16 and 18 whereby the axles 16 and 18 each receive 33⅓ percent of the torque to provide equal torque distribution among all the axles 14, 16 and 18.

My differential is termed a "spur gear differential" primarily to distinguish it from a "planetary gear differential" or a "bevel gear differential"; however, helical or herringbone cut gears may be used in my invention in place of spur gears, within the intent of the claims following.

It has been discovered that the disclosed spur gear diferential structure has a preferred mode of assembly, in which each spur gear set 164 and 166 is placed into the assembly in a specific rotational position. Because the number of teeth in one gear of a set is different from the number of teeth in the other gear of that set, as the gear set is rotated, the positions of the apparently corresponding teeth of the gear having the greatest number of teeth advances with respect to the successive positions of the teeth of the gear having fewer teeth, in a kind of vernier effect. There are usually several positions in which the gears may be meshed with the gears of the other set of the pair during assembly, but if the wrong positions are chosen for the various sets the mesh can become improper later, through the vernier effect. The number of correct positions may vary according to the number of teeth in the gears of a set, but in any case a mark may preferably be placed on each gear set for alignment with a fixed reference point in order to synchronize the vernier effects in the respective sets.

What is claimed is:

1. A torque dividing differential comprising a housing, an input shaft, a carrier member connected to said input shaft, first and second spur gear sets rotatably carried on said carrier, each of said spur gear sets having first and second portions having differing numbers of teeth thereon, said first portion of said first set having the lesser number of teeth and being engaged with said second portion of said second set having the greater number of teeth, a first output shaft, a first side gear connected to said first output shaft and engaged with said second portion of said first set having the greater number of teeth, a second output shaft, and a second side gear connected to said second output shaft and engaged with said first portion of said second set having the lesser number of teeth, to afford torque division between said first and second output shafts.

2. A torque dividing differential in accordance with claim 1 wherein said first and second portions of each spur gear set have 10 and 14 teeth respectively to afford torque division between said first and second output shafts in the ratio of approximately 1:2 respectively.

3. A torque dividing differential according to claim 1 wherein each said first and second set in each pair are initially assembled in the same rotational relationship to each other as the rotational relationship of each other said pair of sets.

References Cited

UNITED STATES PATENTS

| | | | |
|---|---|---|---|
| 2,904,905 | 9/1959 | Armington | 74—714 X |
| 3,260,134 | 7/1966 | Bowen et al. | 74—714 X |

DONLEY J. STOCKING, *Primary Examiner.*

THOMAS C. PERRY, *Assistant Examiner.*